United States Patent [19]
Hunt et al.

[11] Patent Number: 5,733,067
[45] Date of Patent: *Mar. 31, 1998

[54] METHOD AND SYSTEM FOR BIOREMEDIATION OF CONTAMINATED SOIL USING INOCULATED SUPPORT SPHERES

[75] Inventors: Seth C. Hunt, Lakewood; Theodore O. Meiggs, Golden, both of Colo.; Lawrence C. Murdoch; William W. Slack, both of Cinncinnati, Ohio

[73] Assignee: Foremost Solutions, Inc, Lakewood, Colo.

[*] Notice: The portion of the term of this patent subsequent to Jul. 11, 2014, has been disclaimed.

[21] Appl. No.: 701,783

[22] Filed: Aug. 26, 1996

Related U.S. Application Data

[63] Continuation-in-part of Ser. No. 272,816, Jul. 11, 1994, Pat. No. 5,570,973.

[51] Int. Cl.$^6$ .............. A62D 3/00; B09C 1/08; B09C 1/10
[52] U.S. Cl. .............. 405/128; 166/246; 166/280; 210/610; 210/747
[58] Field of Search ............ 166/246, 280, 166/308; 210/601, 610, 747, 901; 405/128; 435/262.5

[56] References Cited

U.S. PATENT DOCUMENTS

| | | | |
|---|---|---|---|
| 4,493,895 | 1/1985 | Colaruotolo et al. | 210/610 |
| 5,032,042 | 7/1991 | Schuring et al. | 405/128 X |
| 5,061,119 | 10/1991 | Balthaus et al. | 210/747 X |
| 5,133,625 | 7/1992 | Albergo et al. | 405/128 X |
| 5,246,309 | 9/1993 | Hobby | 405/128 |
| 5,560,737 | 10/1996 | Schuring et al. | 166/308 X |
| 5,570,973 | 11/1996 | Hunt | 405/128 |
| 5,641,020 | 6/1997 | Cherry et al. | 166/308 X |

*Primary Examiner*—George A. Suchfield
*Attorney, Agent, or Firm*—Edwin H. Crabtree; Ramon L. Pizarro; Donald W. Margolis

[57] ABSTRACT

A method used for in situ remediation of contaminated subsurface ground and subsurface water using chemically or biologically reactive sheets. The reactive or active sheets contain one or more selected compounds capable of recovering, destroying, degrading and immobilizing contaminants in the soil or water. The compounds that will be selected depends on the contaminants to be treated. The compound may be diatomaceaous earth pellets or other porous materials inoculated with selected non-pathogenic microbes, a zero-valent metal such as iron, tin, aluminum and zinc, a leachable compound such as sodium percarbonate or an adsorptive compound such as activated carbon and zeolite. The contaminants may be petroleum hydrocarbons, chlorinated hydrocarbons and other hazardous chemicals. The sheets are formed by injecting a slurry of the selected compound into the subsurface using hydraulic fracturing where the orientation of the fractures is influenced by cutting and preparing a bore hole prior to the injection of the slurry. Also the sheets may be formed by employing high velocity jet-assisted fracturing using air, water and other fluids. The jet-assisted fracturing operates prior to or concurrently with an introduction of a slurry of the selected compound. The sheets may be formed horizontally, vertically and at angles dipping from the horizontal.

15 Claims, 2 Drawing Sheets

METHOD AND SYSTEM FOR BIOREMEDIATION OF CONTAMINATED SOIL USING INOCULATED SUPPORT SPHERES

This application is a continuation-in-part application of an application Ser. No. 08/272,816 filed on Jul. 11, 1994, now U.S. Pat. No. 5,570,973, by a common inventor Seth C. Hunt and having a title of "SYSTEM FOR BIOREMEDIATION OF CONTAMINATED SOIL USING INOCULATED SUPPORT SPHERES".

BACKGROUND OF THE INVENTION (a) Field of the Invention

This invention relates the use of selected compounds for treating contaminated soil and water and more particularly, but not by way of limitation, to a method of in situ remediation of subsurface ground and water using chemically or biologically reactive or active sheets.

(b) Discussion of Prior Art

In U.S. Pat. No. 5,133,625 to Albergo et al. a method and apparatus used for subsurface bioremediation is described. Microorganisms, nutrients and gases are introduced into the soil using a push rod or cylinder connected to a delivery system on top of the ground. Also, U.S. Pat. Nos. 5,263,795 to Corey et al. and 3,094,846 to Peeler, Jr. describe in-situ remediation systems for treating sulfide contaminated soils from coal mining operations and the like.

U.S. Pat. Nos. 4,743,545 to Torobin, 4,987,068 to Trosch et al. and 5,096,814 to Aivasidis et al. describe different types of macroporous and microporous inorganic carriers used with microorganisms. The treated porous material is used for degradation of municipal sewage and industrial waste.

In U.S. Pat. Nos. 4,682,550 and 4,807,454 to Joy, a hand-held apparatus, method and technique are disclosed for loosening, aerating and fertilizing plant and tree roots. Also, U.S. Pat. No. 4,429,647 to Zinck describes a method of loosening soil with a probe and compressed air. Further, U.S. Pat. Nos. 2,083,153 and 1,814,446 to Irish and 429,994 to Botter describe an older type of equipment for aerating soil and treating the soil with fertilizers etc. U.S. Pat. No. 5,266,213 teaches the use of cleaning contaminated water using a tank filled with iron. U.S. Pat. Nos. 5,132,021 and 5,419,840 teach the use of iron, manganese and magnesium for treating ground water.

None of the above-mentioned prior art patents specifically disclose the unique features and method steps of the subject system for in situ remediation of contaminated soil and water as described herein.

SUMMARY OF THE INVENTION

In view of the foregoing, it is a primary object of the invention to treat contaminated subsurface soil and water in situ and destroy, trap or convert the contaminant to harmless components.

Another object of the present invention is to eliminate the need for removing contaminated soil or water and the expense associated with removing and transporting the contaminated soil to a landfill or treating water at above-ground facilities.

Still another object of the system for remediation is to treat the contaminated soil and water using non-pathogenic microbes which are similar to the naturally occurring bacteria in the area surrounding the contaminated site. Also the contaminated soil and water can be treated by other selected compounds such as zero-valent metals, including iron, tin, aluminum or zinc; leachable compounds, such as sodium percarbonate; destructive oxidants, such as potassium permanganate; or adsorptive compounds, such as activated carbon or zeolites.

A further object of the invention is the method for remediation can be practiced with little disturbance of the existing contaminated site other than drilling holes into the ground surface and creating vertical porous reactive sheets downstream from the movement of contaminated ground water. Also horizontal porous sheets can be created below a leaky storage tank or similar contaminated area where the migration of the contaminant is downward.

The subject method of treating contaminated subsurface formations and subsurface water provides for forming chemically or biologically reactive sheets by injecting a slurry of a selected compound into the subsurface. The orientation of the sheets is influenced by cutting and preparing a bore hole prior to the injection of the slurry. The sheets formed by fracturing the subsurface formations, with the slurry filling the fractures. Also the sheets may be formed by employing high velocity jet-assisted injection using air, water and other fluids. The jet-assisted injection operates prior to or concurrently with the introduction of a slurry of a selected compound. The sheets may be formed horizontally, vertically and at angles dipping from the horizontal.

These and other objects of the present invention will become apparent to those skilled in the art from the following detailed description, showing the contemplated novel construction, combination, and elements as herein described, and more particularly defined by the appended claims, it being understood that changes in the precise embodiments to the disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
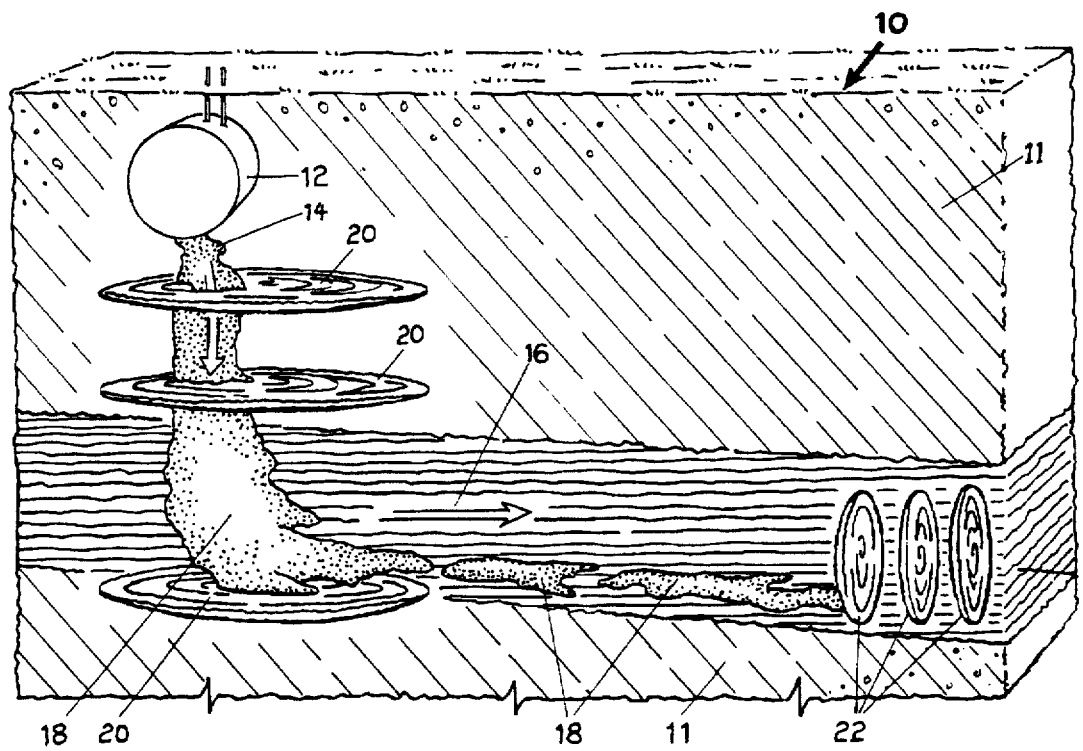
FIG. 1 is a sectional view of a subsurface with ground water flow. A tank is shown leaking a halogenated organic liquid known as a "Dense Non-Aqueous Phase Liquid" or "DNAPL". In this example, three horizontal and three vertical reactive sheets have been constructed for treating the contaminant.

In FIG. 1, a cross section of a ground surface 10 is illustrated. An underground storage tank 12 is shown having leaked a halogenated organic liquid 14 such as a chlorinated solvent in soil 11. These types of liquids are normally heavier than water and are categorized as "Dense Non-Aqueous Phase Liquids" or "DNAPL". When these type of compounds are spilled or leak into the soil 11, they are drawn downwardly through the soil 11 by gravity. When they encounter ground water 16, they continue to sink because of their greater density. Typically, these chemicals form pools 18 of contamination that slowly bleed into the ground water 16 as shown. Heretofore, this situation commonly resulted in soil 11 and ground water 16 that was contaminated at considerable depths and a contamination source that was difficult to remediate.

Through the use of the subject method for in situ remediation of the contaminated soil 11 and the ground water 16, horizontal reactive sheets 20 and vertical reactive sheets 22 having a selected compound can treat, destroy, immobilize and recover the contaminants such as the halogenated organic liquid 14 as shown in FIG. 1. The reactive sheets 20 and 22 are porous and are designed to capture and treat the liquid 14 as it flows therethrough.

In this example, two horizontal reactive sheets 20 are placed at different depths below the leaking tank 12 and a third reactive sheet 20 is placed at the bottom of the flow of the ground water 16. Also, to further capture contaminants such as liquid 14 which has pooled at the bottom of the flow of the ground water 16, a series of parallel vertical reactive sheets 22 have been placed downstream from the leaking tank 12. In this manner, the horizontal reactive sheets 20 treat and destroy the contaminant as it bleeds downwardly by gravity from the leaking tank 12 and the liquid 14 already pooled in the ground water 16 is captured or destroyed downstream using the porous vertical reactive sheets 22.

While the subject method of in situ remediation may use both chemically and biologically reactive sheets, the sheets 20 and 22 in FIG. 1 might be filled with zero-valent iron or other halogen-reducing metals for rapid degradation of the halogenated organic liquid 14. Also, if it was more effective, porous inorganic support spheres such as diatomaceous earth pellets could be pretreated by inoculation with selected non-pathogenic microbes, ie. bacteria, and placed in the horizontal and vertical sheets 20 and 22 for destroying or converting the contaminant liquid 14. Further and depending on the type of contaminant, leachable or adsorptive compounds might be selected for placement in the reactive sheets 20 and 22.

Figure 2:
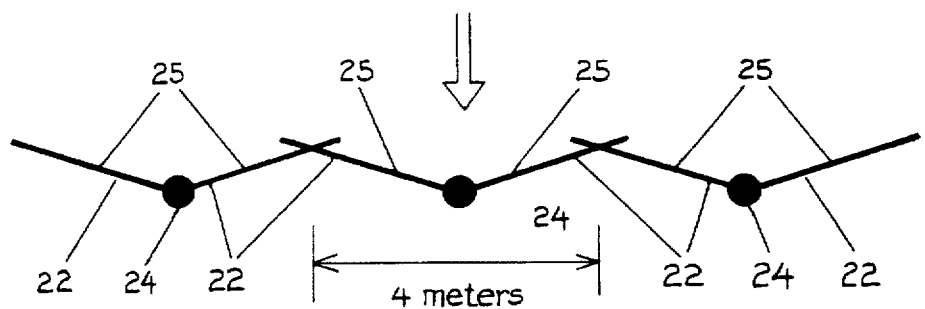
FIG. 2 is a top view of three bore holes used to create three vertical overlapping reactive sheets for treating underground water

FIG. 2 shows a top view of three bore holes 24 used to create three vertical overlapping reactive sheets 22 for treating ground water 16. The sheets 22 are similar to the vertical reactive sheets 22 shown in FIG. 1, but in this example arms 25 of the three sheets 22 overlap so that the ground water 16 must flow through the porous sheets 22 for treatment of the contaminant in the water.

Figure 4:
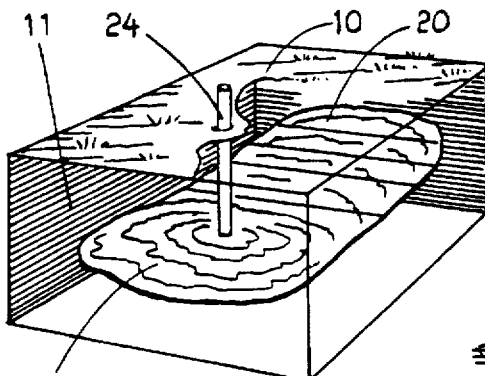
FIG. 4 illustrates a sectional view of a ground subsurface using a method of jet-assisted injecting the subsurface for creating a horizontal induced fracture and at the same time introducing a slurry carrying a selected compound for treating a contaminated area.

Referring now to both FIGS. 2 and 4, vertical reactive sheets 22 are created using a device to move tubing 26 upward or downward in the bore hole 24. The device is not shown in the drawings but may be a hydraulic cylinder, a chain driving a sliding under carriage or similar device. The configuration of the tubing 26 includes two nozzles 28 opposed to each other for forming a broad obtuse angle (120 to 160 degrees) from each other. Casing in the bore holes 24 is cut to implementation of this procedure. The cut may be made with the high velocity jets themselves, or it can be made with a rotating mill, saw or similar device.

During the operation of the device, high velocity jets, indicated by lines 30 in FIG. 4, from the nozzles 28 are moved up or down in the bore hole 24 to cut a cavity 32. This type of fracturing is called Jet-Assisted Injection and makes use of fluids injected through the nozzles 28 at relatively high velocities and low flow rates (100 to 1000 ft/sec and 5 to 20 gpm). The jets 30 consist of a fluid wherein water is used in most applications. A fluid or slurry 34 containing the reactive solids and the high velocity jets 30 are operated concurrently, but the injection takes place through separate tubes and the two different fluids are mixed in the subsurface. In general, the tube 26 accessing the jets 30 extends down the center of the bore hole 24 with the slurry 34 circulated downwardly between the sides of the bore hole 24 and the tube 26. Using this type of Jet-Assisted Injection both the horizontal and vertical reactive sheets 20 and 22 can be formed as shown in the drawings. Also, slurries containing fine-grained solid particles may be injected directly using the high pressure jet.

As the cavity 32 is cut forming the vertical sheet 22 as shown in FIG. 4, the slurry 34 containing, in this example, zero-valent metal iron particles is introduced into the cavity 32. The jets 30 are operated and translated in the bore hole 24 during the injection of the slurry 34 to keep the vertical sheet 22 open and to direct the flow of the slurry 34 into the cavity 32 being created. The top and the bottom of the vertical sheet 22 can be positioned at any depth and during most applications the vertical sheets 22 will extend above and below the height of the contaminated zone. The width of the vertical sheets may be in a range of 5 to 10 cm and greater and the combined length of the arms 25 of each vertical sheet may be in a range of 2 to 4 meters and greater.

In using the Jet-Assisted Injection for creating horizontal reactive sheets 20, the jets 30 are rotated to cut a horizontal, circular cavity and then the slurry 34 is injected to fill the cavity 32. Using this method, the horizontal reactive sheets 20 can be created in length of 2 to 4 meters or greater. Also, larger horizontal sheets 20 can be created by hydraulic pressurizing the cavity 32 and extending it as a hydraulic fracture. If the method as practiced is done where the subsurface conditions favor steeply dipping fractures, the method is modified by operating the jets 30 during the injection of the slurry 34. The jets 34 are rotated during the injection of slurry 34 to provide horizontally directed kinetic energy to flow. In this manner, the dip angle due to the dipping fractures is decreased and a horizontal orientation of the sheet 20 is maintained.

The method as described herein can also be used to direct propagation in one direction away from the bore hole 24, controlling the asymmetry of the horizontal sheet 20. One application is to inject slurry 34 while a single jet 30 is operated in one direction. This will cause the fracture to grow preferentially in that direction. Causing fractures to propagate beneath or away from structures, such as buildings or pits, is one application. Alternatively, if geology is causing the fracture to propagate preferentially in one direction and a symmetric fracture is desired, then the nozzle 28 is pointed away from the geology preferred direction. This will cause propagation away from the geology preferred direction.

The direction of fracture propagation is monitored by measuring the displacement of the ground surface. The propagation direction is determined from surface displacement measurements and then the direction of the jet is adjusted accordingly. One application is to rotate the tube 26 containing the nozzles 28 and jets 30 with a stepper motor interfaced with a system to measure ground displacements. The direction of the jet or jets 30 is continually adjusted based on the ground displacements to facilitate creation of a symmetric reactive sheet.

In a typical hydraulic fracturing process, the sheets of granules of reactive solid compounds are mixed with guar gum gel, a viscous fluid, to form the slurry 34 that is injected into the growing fracture created by the water jets 30. After the pumping of the slurry 34, the cavity 32 is propped open by sand or other like solid materials and the guar gum gel is decomposed by an enzyme added during the injection.

As mentioned above, the horizontal and vertical sheets 20 and 22 are filled with the dense slurry 34 as the cavity 32 is created, with the high shear strength of the guar gum gel supporting the solid compounds during injection. Concentrations of 0.7 to 1.0 L bulk granular solids/L gel are typical for most applications. The enzyme causes the gel to break down to a thin fluid within 24 to 48 hours after injection.

Figure 3A:
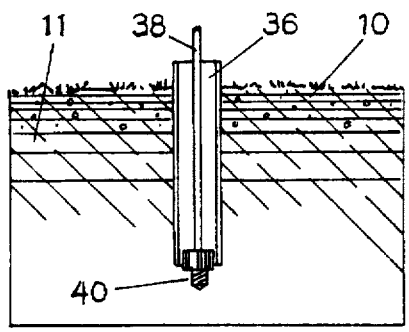
FIGS. 3A–3D illustrate sectional views of a ground subsurface using a method of hydraulic fracturing the subsurface for creating a horizontal induced fracture used in the subject invention.
Figure 3B:
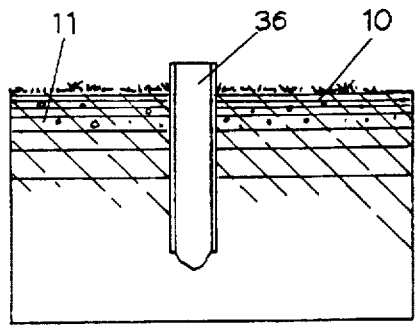
Figure 3C:
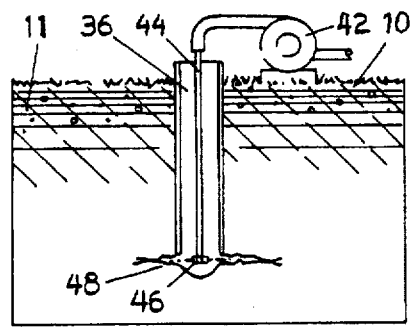
Figure 3D:
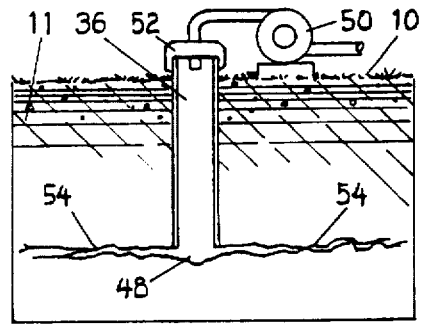

FIGS. 3A–3D illustrate sectional views of the ground subsurface using another method of hydraulic fracturing the subsurface for creating a horizontal induced fracture and forming a horizontal reactive sheet 20. A casing 36 with rod 38 having a drive point 40 is pushed or driven into the soil 11 to a desired depth. In FIG. 3B, the rod 38 with drive point 40 is removed from the bore hole and the lateral pressure of the soil 11 seals the casing 36. In FIG. 3C, a high pressure pump 42 with tubing 44 is used with a fluid jet 46 for cutting a notch 48 in the soil 11 at the of the casing 36. In FIG. 3D, when the notch 48 is completed, the pump 42 is removed and a slurry injection pump 50 with casing seal 52 is installed and slurry 34 is pumped under pressure into the notch 48 inducing a hydraulic fracture 54 used in creating the horizontal reactive sheet 20. In the alternative, a solid casing of cement or plastic pipe can be created in a bore hole and slots cut through the casing at selected depths. At a selected depth a straddle packer is used to direct the injection of the slurry 34 to create a horizontal reactive sheet 20. In this manner, multiple reactive sheets 20 can be created at various depths along the length of the same casing. Packers, or other seals, are then inserted into the casing to provide access to, or to isolate, reactive sheets as required by a particular design.

Figure 5:
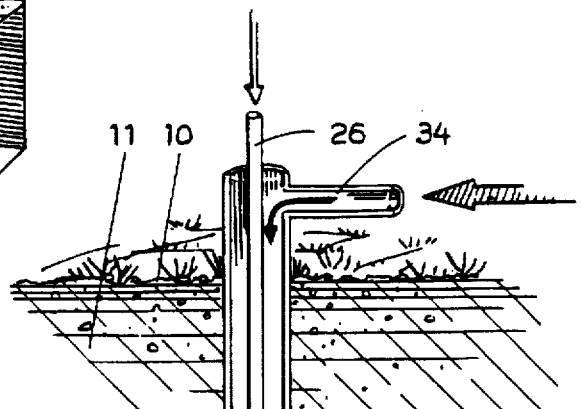
FIG. 5 illustrates a three dimensional view of a bore hole and a horizontal reactive sheet created by hydraulic fracturing.

Referring now to FIG. 5, the horizontal and vertical reactive sheets 20 and 22 created using the above discussed methods will typically follow one of two idealized forms. One form consists of a steeply dipping fracture that has a greater vertical than lateral dimension. This type of vertical sheet 22 climbs rapidly and reaches the ground surface in the vicinity of the bore hole after modest volumes of slurry 34 are injected. Significant propagation of the fracture ceases after this has occurred.

In another form, the horizontal sheet 20 will typically be elongated in a plan view and will dip gently toward the bore hole 24. In some cases, the reactive sheet 20 is nearly flat-lying in the vicinity of the bore hole 24 and the dip increases to 10 to 20 degrees at some distance away, as shown in FIG. 5. In other cases, a hydraulic fracture created by the methods as discussed appears to maintain a roughly uniform dip from the bore hole 24 to the termination of the fracture.

The reactive sheets 20 and 22 described herein will be filled with material that provides the ability to keep open the fractures and/or to recover, destroy, immobilize contaminants in soils, and otherwise reduce the risk of exposure to contaminants in soils, sediments or rock. The materials include but are not limited to the following:

Porous glass or ceramic products

These products include treated diatomaceous earth (trade name ISOLITE or similar porous materials), expanded perlite, vermiculite, or related compounds. The intended uses of these materials include serving as a substrate for microorganisms, aqueous-phase nutrients and electron acceptors used for bioremediation.

Zero-valent metal

These metals include iron, tin, aluminum, zinc, and other metals capable of reductively dechlorinating and degrading organic compounds.

Leachable compounds

These compounds include solids that dissolve in water to slowly release a beneficial chemical. One example is sodium percarbonate and other compounds which react with water to produce oxygen to create aerobic conditions for bioremediation. Also solid forms of nitrogen, phosphorous, oxidants and nutrients for microorganisms are included. Stronger oxidants, such as potassium permanganate, that may oxidize organic and inorganic chemicals are also included.

Absorptive compounds

These compounds include activated carbon and zeolites that adsorb contaminants and remove them from an aqueous phase.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A method for in-situ remediation of a contaminated ground using a chemically or biologically treated reactive sheet, the reactive sheet contains a selected compound that recovers, destroys or immobilizes the contaminants in the soil; the steps comprising:

drilling a bore hole into the contaminated ground;

creating a fracture in the ground at a selected depth in the bore hole; and filling the fracture with a slurry containing a selected compound comprising porous inorganic support spheres inoculated with selected microbes for treating the contaminated ground.

2. The method as described in claim 1 wherein the step of creating the fracture in the ground includes fracturing the ground using fluid pressure.

3. The method as described in claim 2 wherein the step of filling the fracture with a slurry includes pumping the slurry under pressure while fracturing the ground using fluid pressure.

4. The method as described in claim 1 wherein the step of creating the fracture in the ground includes creating a fracture outwardly and around a circumference of the bore hole and creating a horizontal treated reactive sheet when the fracture is filled with the slurry.

5. The method as described in claim 1 wherein the step of creating the fracture in the ground includes creating a fracture along a portion of a length of the bore hole and creating a vertical treated reactive sheet when the fracture is filled with the slurry.

6. A method for in-situ remediation of a contaminated ground and contaminated ground water using a chemically or biologically treated reactive sheet, the reactive sheet contains a selected compound that recovers, destroys or immobilizes the contaminants in the soil and water; the steps comprising:

drilling a bore hole into the contaminated ground and ground water;

creating a fracture in the ground using fluid pressure at a selected depth in the bore hole; and filling the fracture with a slurry under fluid pressure, the slurry containing a selected compound comprising porous inorganic support spheres inoculated with selected microbes for treating the contaminated ground and ground water.

7. The method as described in claim 6 wherein the step of fracturing the ground using fluid pressure includes employing high velocity jet-assisted fracturing using air and water.

8. The method as described in claim 7 wherein the step of filling the fracture with a slurry includes pumping the slurry under pressure into the fracture concurrently with the high velocity jet-assisted fracturing of the ground.

9. The method as described in claim 6 wherein the step of creating the fracture in the ground includes creating a fracture outwardly and around a circumference of the bore hole for creating a horizontal treated reactive sheet when the fracture is filled with the slurry.

10. The method as described in claim 6 wherein the step of creating the fracture in the ground includes creating a fracture along a portion of a length of the bore hole for creating a vertical treated reactive sheet when the fracture is filled with the slurry.

11. A method for in-situ remediation of a contaminated ground and contaminated ground water using a chemically or biologically treated reactive sheet, the reactive sheet contains a selected compound that recovers, destroys or immobilizes the contaminants in the soil and water, the compound comprising diatomaceous earth pellets inoculated with selected non-pathogenic microbes, or an adsorptive compound comprising activated carbon or zeolites, the contaminants comprising petroleum hydrocarbons, chlorinated hydrocarbons and other hazardous chemicals; the steps comprising:

drilling a plurality of bore holes into the contaminated ground and ground water;

creating a plurality of fractures in the ground using fluid pressure at selected depths in the bore holes; and filling the fractures with a slurry under fluid pressure, the slurry containing a selected compound for treating the contaminated ground and ground water.

12. The method as described in claim 11 wherein the step of creating the fractures in the ground includes creating fractures outwardly and around a circumference of the bore holes and creating a plurality of horizontal treated reactive sheets at various depths in each bore hole when the fractures are filled with the slurry.

13. The method as described in claim 11 wherein the step of creating the fractures in the ground includes creating fractures along a portion of a length of each bore hole and creating a plurality of vertical treated reactive sheets when the fractures are filled with the slurry.

14. The method as described in claim 13 wherein the step of creating a plurality of vertical treated reactive sheets includes overlapping ends of the vertical sheets formed in adjacent bore holes.

15. The method as described in claim 11 wherein the step of creating the fractures in the ground includes creating fractures outwardly and around a circumference of the bore holes and creating a horizontal treated reactive sheet in each bore hole at a selected depth when the fractures are filled with the slurry.

* * * * *